United States Patent
Reichenbach et al.

(10) Patent No.: US 7,215,835 B2
(45) Date of Patent: May 8, 2007

(54) METHOD FOR OPERATING OPTOELECTRONIC SENSORS AND SENSOR

(75) Inventors: Juergen Reichenbach, Emmendingen (DE); Carl Joseph Hafner, Emmendingen (DE); Peter Hauser, Freiburg (DE); Christiane Fillhardt, Schutterwald (DE)

(73) Assignee: Sick AG, Waldkirch (DE)

( * ) Notice: Subject to any disclaimer, the term of this patent is extended or adjusted under 35 U.S.C. 154(b) by 784 days.

(21) Appl. No.: 10/431,684

(22) Filed: May 8, 2003

(65) Prior Publication Data

US 2003/0215147 A1 Nov. 20, 2003

(30) Foreign Application Priority Data

May 18, 2002 (DE) ............................... 102 22 281

(51) Int. Cl.
*G06K 7/10* (2006.01)
*G06K 9/20* (2006.01)

(52) U.S. Cl. .................. 382/321; 382/232; 382/323; 235/435; 235/454

(58) Field of Classification Search ............... 382/183, 382/232, 245, 321, 323, 324; 358/426.07, 358/426.13; 235/435, 454
See application file for complete search history.

(56) References Cited

U.S. PATENT DOCUMENTS

| 4,590,606 | A | | 5/1986 | Rohrer |
| 4,651,221 | A | | 3/1987 | Yamaguchi |
| 5,610,995 | A | | 3/1997 | Zheng et al. |
| 5,703,349 | A | * | 12/1997 | Meyerson et al. ..... 235/462.48 |
| 2001/0034222 | A1 | * | 10/2001 | Roustaei et al. ............ 455/403 |

FOREIGN PATENT DOCUMENTS

| DE | 19708195 C2 | 11/1997 |
| DE | 19919600 A1 | 11/1999 |
| EP | 0 535 966 A2 | 4/1993 |

* cited by examiner

*Primary Examiner*—Phuoc Tran
(74) *Attorney, Agent, or Firm*—Townsend and Townsend and Crew LLP

(57) ABSTRACT

A method for operating an optical sensor which has a light receptor that receives line-by-line reflected or returned light for a complete picture. At least some of the received pictures are compressed with a picture compression algorithm. To process the picture and more quickly store it in a memory-saving manner, the optoelectronic sensors compress the picture simultaneously with its receipt by the receptor. Optoelectronic sensors for use in this manner can be a code laser or a laser scanner for determining distance or generating separation pictures.

21 Claims, 3 Drawing Sheets

METHOD FOR OPERATING OPTOELECTRONIC SENSORS AND SENSOR

BACKGROUND OF THE INVENTION

The present invention relates to optoelectronic sensors, and especially to code readers, and to a method for operating such sensors, which involves receiving reflected light of a complete picture or visual representation line-by-line with a light receptor and compressing at least some of the pictures with a picture compression algorithm.

Optoelectronic sensors such as code readers read codes, such as one-dimensional bar codes or two-dimensional matrix codes, and they operate according to a variety of principles. Code readers which employ the scanner principle read the code by scanning a light beam over the object in question, for example a label carrying a bar code. Light reflected or returned by the object is received by a light receptor and converted into electronic signals. Bar code information is derived from amplitude information of the electronic signals.

Two-dimensional codes are typically read with code readers that operate on the camera principle. The object in question is illuminated with surface lighting or line-like light fields, which results in light that is reflected or returned by the object and received by a one- or two-dimensional receiver array, for example a CCD or CMOS line or matrix sensor. By making use of the amplitude differences of the received pixels, the code and therefrom code information can be derived.

U.S. Pat. No. 5,703,349 discloses a portable code reader which compresses received pictures prior to further processing them to facilitate, for example, their wireless transmission.

The compression of pictures is also useful for a variety of other applications. Such applications include, for example, the storage of selected pictures, such as reference pictures or pictures containing errors, which can be used for the subsequent analysis of errors, or test pictures with which the sensor can learn certain parameters, and similar uses.

SUMMARY OF THE INVENTION

In view of the foregoing, it is an object of the present invention to provide an improved method for operating optoelectronic sensors and to provide a code reader which can be used in such a method that permits a more rapid processing and that saves memory space.

In general, this object is attained by starting to compress the pictures while they are still being received.

According to the invention, the operation of optoelectronic sensors of the invention, especially code readers, involves the line-by-line receipt of reflected and/or returned light by a light receptor and the compression of the picture as the picture information is being received.

The time required for receiving and compressing a picture is thereby significantly shortened because the picture compression takes place substantially simultaneously with the receipt of the picture. This permits an increase of the reading speed for code readers and/or having more time for making use of the picture or the data received or read by the sensor.

One aspect of the present invention provides that each line of a picture is compressed immediately following the receipt of a complete line. Alternatively, compression can take place after the receipt of a predetermined number of complete lines. In a further alternative, compression takes place after the receipt of only a portion of a line, that is, after the receipt of a predetermined number of pixels of the picture.

It can also be advantageous to further process the results of the compression following the compression of each line or number of lines, for example by storing the compression result or transmitting it in substantially real time via a bandwidth limited interface. Alternatively, instead of processing the received information line-by-line, the completely compressed picture can be further processed, for example by transmitting it via a bandwidth limited interface.

Although picture compression as such is generally known, it provides significant advantages in the context of the present invention, because the compressed pictures require only little memory space, which allows one to store several pictures in a memory-saving manner. In one embodiment, the pictures can be so-called NOREAD pictures. These are pictures of a code that is to be read, for example a bar code or a two-dimensional code, which led to error readings of the code. This can equally involve any type of other recognizable optical representations such as, for example, OCR printing or handwriting. The presence of a series of NOREAD pictures, for example 20 to 30, in the memory makes effective error analysis possible, which, once the error has been recognized, can be corrected to improve the error recognition rate of sensors. Thus, it is, for example, possible to adapt the algorithm for reading codes to codes which are difficult to read. In another application, the picture compression of the present invention makes it possible to compare test codes that are to be read with stored reference codes as a way, for example, for optimizing filters.

The compressed pictures can be temporarily or permanently stored in the sensor, for example to make them quickly accessible via a bandwidth limited interface for subsequent analysis. Such analysis, for example, can be performed locally or via the Internet over long distances. Compressed picture data can be more rapidly and better transmitted to an external processing unit via a bandwidth limited interface. This is particularly advantageous for remote analysis via networks.

The present invention can also be advantageously used with other optoelectronic sensors such as laser scanners for measuring and/or recognizing objects, as is incorporated, for example, in the LMS instruments distributed by SICK AG of Waldkirch, Germany, the assignee of this application. Such scanners can generate separation or distance pictures and can be used, for example, at toll stations for classifying vehicular traffic. In such use the ability to store erroneously read, compressed pictures simplifies the error diagnosis or simplifies the exploitation of reference pictures.

The pictures that are processed in accordance with the present invention can be color pictures, gray-scale pictures or binary pictures (black/white), as well as distance pictures from the earlier mentioned LMS instruments, which identify distances in the picture as gray-scale or color values. They can be transmitted over a variety of interfaces such as, for example, serial, asynchronous, etc. interfaces of the sensors, and they can use a variety of protocols, including Ethernet, TCP-IP, ftp, etc.

It is advantageous to use as the compression method a process generally known under the designation JPEG.

In a refinement of the present invention, the degree or extent of compression is adjustable. This permits adapting the degree of compression to the encountered circumstances so that in each instance the highest possible, still acceptable degree of compression can be used, which ultimately saves memory space and speeds up data transmissions.

It is particularly advantageous when the degree of compression can be automatically selected by the sensor as a function of certain parameters, in the case of code readers, for example, the decodability of the compressed picture, the available storage media, or the bandwidth of the transmission channel.

It has been found that a compression ratio of between 20 to 50 provides good results so that, following compression and, if necessary, decompression, sufficient information is retained to conduct an error analysis. A compression ratio of 50 is often usable for visually evaluating pictures for obvious printing errors, or detecting damaged or possibly lost code labels which are responsible for the creation of NOREAD pictures. When the printing of the code or the surroundings of the code is responsible for a NOREAD picture, the picture compression ratio may have to be lowered to permit a meaningful analysis.

A code reader made in accordance with the present invention has a light receptor arrangement which can receive at least one line, a processing and evaluation unit, and a picture compression unit. Means are provided for the line-by-line readout of data from the light receptor unit, and the picture compression unit has means for compressing the readout lines and combining them into a complete, compressed picture. The light receptor arrangement is then ready to receive additional line information while the compression unit compresses the previously read-out line or lines.

A further development of the present invention contemplates providing a memory for the compressed pictures advantageously constructed as first-in, first-out (FIFO) memories and which permit a line-by-line storage of the compressed picture. When the memory is full, this permits the storage of the most recently received, compressed picture, while the oldest stored picture in the memory is deleted or written over. In this manner, the most recent pictures are always retained so that they are always available for the further analysis or other exploitation of the most recent pictures.

DESCRIPTION OF THE PREFERRED EMBODIMENTS

In the following the invention is described with reference to a code reader. However, as mentioned in the beginning, it can be equally incorporated in other optoelectronic sensors.

Figure 1:
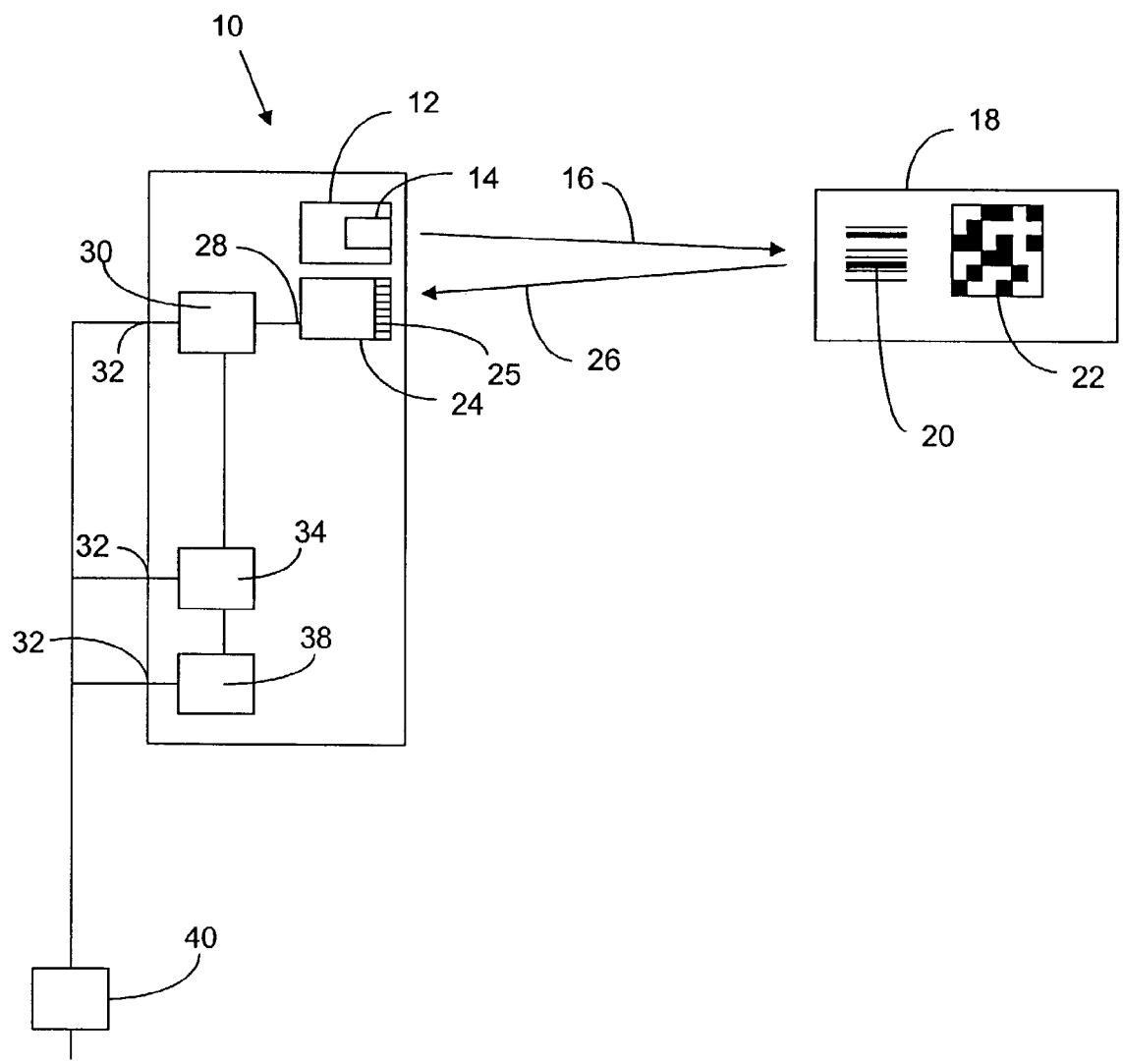
FIG. 1 schematically illustrates the code reader of the present invention.

Referring to FIG. 1, the illustrated optoelectronic sensor, a code reader 10, has a light emitter 12 with a light source 14 that emits a light beam 16. Light beam 16 illuminates an object 18 that carries a code 20 or 22. The code can be a one-dimensional bar code schematically illustrated at 20 or a two-dimensional code 22. Other codes, such as color codes, for example, can also be employed. To completely cover code 20 or 22 with light beam 16, the code reader 10 has a light deflecting device (not separately shown) which scans the light beam over codes 20 or 22.

Light beam 16 can be linearly focused on object 18 so that, for one-dimensional codes 20, it illuminates the entire length of the code or, for two-dimensional code 22, so that the code is completely scanned by line-shaped light beam 16. Code reader 10 further has a light receptor 24 which receives light 26 reflected by and/or returned from object 18. Light receptor 24 typically has its own optics. Light receptor 24 converts the received light into an electrical signal which is available at output 28 for further processing.

Light receptor 24 preferably also has a one-dimensional, that is, a one-line, receiving array (not further shown) so that the illuminated area of the object can be completely reproduced by the receptor. The receiving array can be a line sensor or a two-dimensional matrix sensor of the CCD or CMOS type. When matrix sensors are used, several lines are simultaneously received.

Code reader 10 can also be a camera. In such a case, the code reader only has a light emitter 12 and a light receptor 24 and no light emitter 12. The code can be illuminated with external lighting.

Electrical signals which correspond to the received light are fed to a processing unit 30, where code 20 or 22 is read and decoded. Information contained in the code 20 or 22 is transmitted via an appropriate interface 32 or it can be used in any other desired manner.

In accordance with the invention, the received lines are transmitted to a picture compression unit 34 where the lines are compressed with a compression algorithm. Compression takes place either after each line or, preferably, following the receipt of a predetermined number of lines which are then compressed in one step. The known JPEG algorithms have been particularly useful and advantageous for this purpose. It is further preferred to simultaneously compress eight lines.

The compressed picture, that is, the sum of all lines of a picture, can be read out, for example via an interface 32, or it can be stored in a memory 38 and can be read out via interface 32 at a later point in time.

Memory 38 can be incorporated in the sensor and stores the data either temporarily in a RAM or permanently in a Flash-Prom. Alternatively, the memory can be separate from the sensor and can, for example, be a diskette. In one preferred embodiment of the invention, memory 38 is of the "first-in, first-out" (FIFO) type, which always stores the most recent compressed pictures while the oldest stored pictures are deleted or written over when memory space has run out. In this manner, the most recently obtained pictures are always stored.

The interface can be bandwidth limited, and any desired interface such as serial, parallel, asynchronous, etc. can be used. Further, a variety of protocols such as Ethernet, TCP/IP or the like can be used.

Compressed pictures which are to be further evaluated or otherwise used can be transmitted via interface 32 to an exploitation unit 40, for example an error detecting unit. The exploitation unit can form part of or be separate of the sensor. The present invention is particularly useful for long-distance error analyses, for example via wide area networks such as the Internet.

Figure 2:
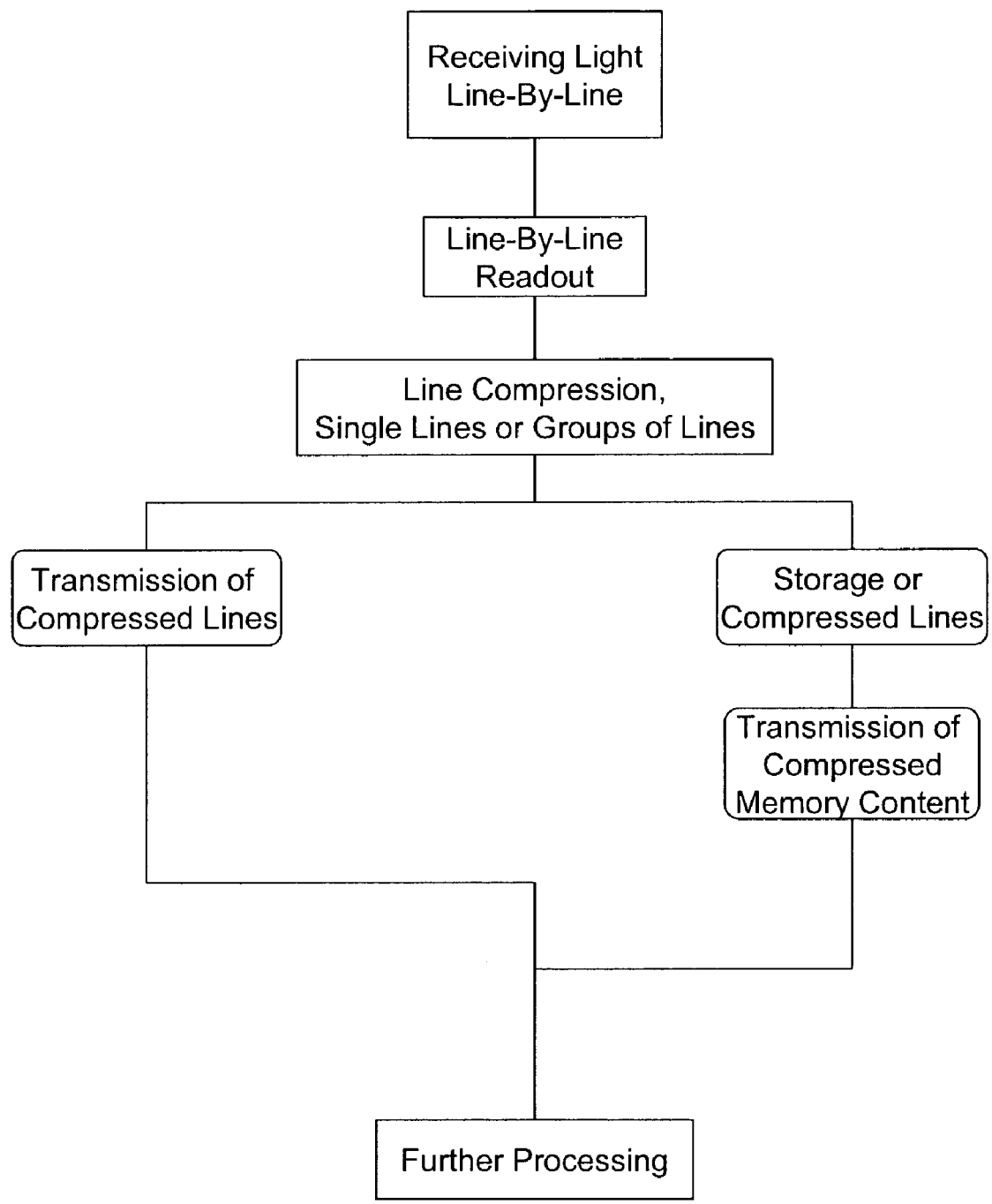
FIG. 2 is a flow diagram illustrating the method of the present invention.
Figure 3:
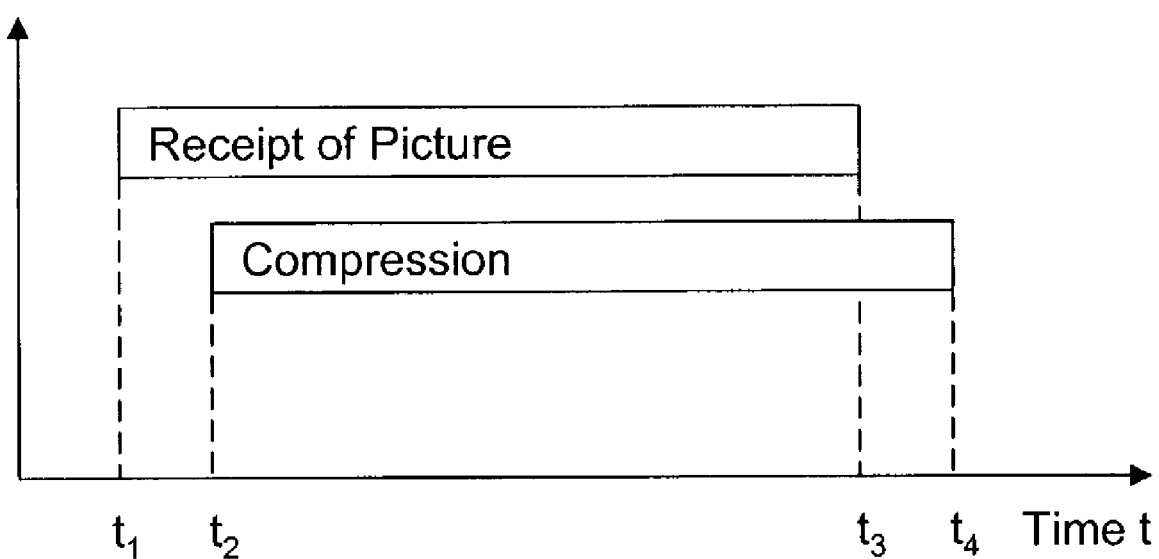
FIG. 3 is a timeline which illustrates when the various operating steps take place.

Referring to FIGS. 2 and 3, the method of the present invention proceeds as follows:

Following the line-by-line receipt of the light, the first received lines are read out to the exploitation unit and, if the picture is to be compressed, forwarded to the picture compression unit 34. Picture compression unit 34 compresses either each individual line or a group of lines. The compressed lines can either be read out or stored for further processing.

Simultaneously with the compression of the lines, either individually or in groups, the light receptor receives additional lines of the picture and forwards them to the exploitation unit. In this manner, a picture is substantially simultaneously received and compressed, as is illustrated in FIG. 3. At time $t_1$, the line-by-line picture reception begins. Following the receipt and transmission of a predetermined number of lines to the picture compression unit, compression of the first lines starts at time $t_2$. The receipt of the last line of the picture is completed at time $t_3$, and the last line is compressed at time $t_4$. As is shown in FIG. 3, the time difference $t_2-t_1$ must be about the same as the difference $t_4-t_3$.

FIG. 3 demonstrates a significant advantage of the present invention, namely that the temporal overlap of the picture reception and compression leads to a significant time saving, which, depending on the size of the picture and the overlap, can amount to as much as a factor of about 2.

What is claimed is:

1. A method for operating an optoelectronic sensor comprising providing a code reader, receiving light returned by an object line-by-line at the code reader until a complete picture is received, and compressing at least one of the received pictures with a picture compression algorithm while receiving the at least one picture.

2. A method according to claim 1 wherein compressing comprises compressing each received line immediately following its receipt by the sensor.

3. A method according to claim 1 wherein compressing comprises compressing the received light following the receipt of a predetermined number of complete lines.

4. A method according to claim 1 wherein compressing takes place following the receipt of each partial line.

5. A method according to claim 1 wherein compressing takes place following receipt of a predetermined number of pixels of the picture.

6. A method according to claim 1 including further processing the results of compressing following compressing at least one of one line and a predetermined number of lines.

7. A method according to claim 6 wherein further processing comprises storing the results of compressing.

8. A method according to claim 6 wherein further processing comprises transmitting the results of compressing via a bandwidth limited interface.

9. A method according to claim 1 including further processing a compressed, complete picture following compressing of one of a last line and a predetermined number of last lines of the complete picture.

10. A method according to claim 9 wherein further processing comprises transmitting the complete, compressed picture via a bandwidth limited interface.

11. A method according to claim 1 including storing the compressed picture in the sensor.

12. A method according to claim 11 including retrieving the compressed picture from a location remote from the sensor.

13. A method according to claim 1 wherein compressing comprises compressing the received picture with a JPEG compression method.

14. A method according to claim 1 including adjusting a degree to which the picture is compressed.

15. A method according to claim 1 wherein compressing comprises automatically determining with the sensor a degree of compression as a function of predetermined parameters.

16. A method according to claim 1 wherein the picture comprises a code.

17. A method according to claim 16 wherein the code is a bar code.

18. An optoelectronic sensor comprising a code reader adapted to receive at least one optical data line; a readout device for reading out the optical data line received by the light receptor as a line of signals; a picture compression unit for compressing the read-out data line received from the readout device and combining compressed signals into a complete compressed picture defined by the electrical signals, the code reader being further adapted to receive additional optical data lines while the compression unit compresses previously read-out electrical signals; and a unit for using the compressed picture.

19. An optoelectronic sensor according to claim 18 including a memory for storing the compressed pictures.

20. An optoelectronic sensor according to claim 19 wherein the memory comprises a first-in, first-out memory from which, when the memory is full, a first stored compressed picture is deleted to provide room for a most recently compressed picture.

21. An optoelectronic sensor according to claim 19 wherein the memory is adapted to store the compressed picture line-by-line.

* * * * *